United States Patent [19]

Hasenberg et al.

[11] 4,078,684
[45] Mar. 14, 1978

[54] FOLDING GOOSENECK TRAILER AND METHOD

[75] Inventors: Larry E. Hasenberg, Kewanee; Richard L. Van Hyfte, Annawan; William R. Camey, Kewanee, all of Ill.

[73] Assignee: Hyster Company, Portland, Oreg.

[21] Appl. No.: 675,797

[22] Filed: Apr. 12, 1976

[51] Int. Cl.² .............................................. B60F 1/04
[52] U.S. Cl. .................................. 214/506; 214/152; 280/423 B
[58] Field of Search ............. 214/505, 506, 152, 77 P, 214/DIG. 10; 280/423 B, 425 A, 490 R; 254/10 R, 10 B, 10 C

[56] References Cited
U.S. PATENT DOCUMENTS

| 2,587,067 | 2/1952 | Sachtleber | 254/10 C X |
| 2,605,916 | 8/1952 | Martin | 214/506 |
| 3,756,443 | 9/1973 | Verschage et al. | 214/506 |

Primary Examiner—Robert G. Sheridan
Attorney, Agent, or Firm—Francis L. Swanson

[57] ABSTRACT

An industrial trailer having a collapsible gooseneck which forms a ramp over which equipment may be loaded onto the trailer is disclosed. Hydraulic cylinders contained within the bed of the trailer control the raising and lowering of the gooseneck. A method is also disclosed whereby operation of the gooseneck while attached to the tractor can be used to facilitate changing of the tires on both the tractor and the trailer itself.

23 Claims, 11 Drawing Figures

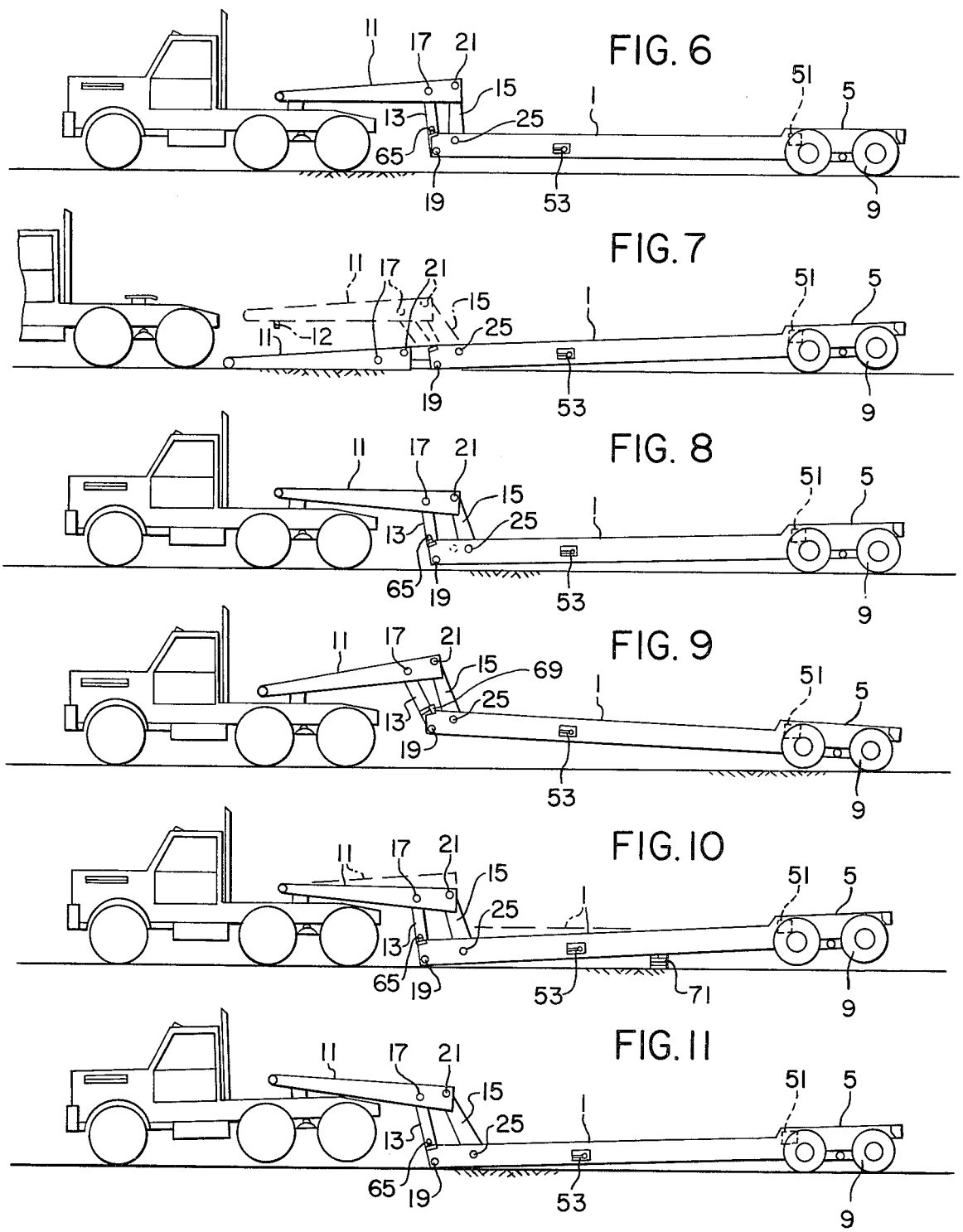

FOLDING GOOSENECK TRAILER AND METHOD

BACKGROUND OF THE INVENTION

1. Field of the Invention

The present invention relates to heavy-duty industrial trailers, and more particularly, those which have collapsible goosenecks to facilitate loading and unloading of equipment.

2. Description of Prior Art

Conventional heavy-duty industrial trailers usually consist of a low bed with multiple wheels at the rear and a fixed gooseneck at the front which engages the fifth wheel of the tractor. To facilitate easy loading, trailers with folding goosenecks have been developed. These may be either operated mechanically or by employing fluids. Mechanical versions employ cables to lift the gooseneck. A typical illustration is disclosed in U.S. Pat. No. 2,605,916, to Martin. A hydraulic version is shown in U.S. Pat. No. 2,441,710 to Martin.

Mechanical versions are generally slow and require a winch and cable or similar device mounted on the tractor. Hydraulic versions generally require a retractable pedestal to hold the platform level with the ground. The gooseneck folds down to form an inclined ramp to load the bed of the trailer. These trailers are often difficult to load or unload on sloping or uneven ground.

SUMMARY OF THE INVENTION

A principal object of the present invention is to provide a trailer having a bed which may be lowered to the ground and a gooseneck which will fold out to form a flat ramp over which equipment may be loaded onto the trailer.

A further object of the invention is to provide a trailer which may be lowered to the ground without the aid of a supplemental undercarriage or ground-engaging pads.

A further object of the invention is to provide a trailer having a compression link pivotable and slideable within the trailer bed to alter the angle and position of the gooseneck and to lower the gooseneck and bed to the ground.

A further object of the invention is to provide a folding gooseneck trailer construction which may be used in a manner which facilitates the changing of the tires on the tractor or on the trailer itself.

BRIEF DESCRIPTION OF THE DRAWINGS

Other objects and advantages relating to the invention will become evident to those skilled in the art from the following detailed description which proceeds with reference to the drawings wherein:

FIG. 6 shows the tractor and trailer in the normal travel position.

FIG. 7 shows the gooseneck folded to form a load ramp for the trailer bed.

FIG. 8 shows the trailer partially lowered to clear overhead obstacles.

FIG. 9 shows the trailer raised above normal to increase the ground clearance.

FIG. 10 shows a means for changing the trailer tires.

FIG. 11 shows a means for changing the tractor tires.

DETAILED DESCRIPTION

Figure 1:
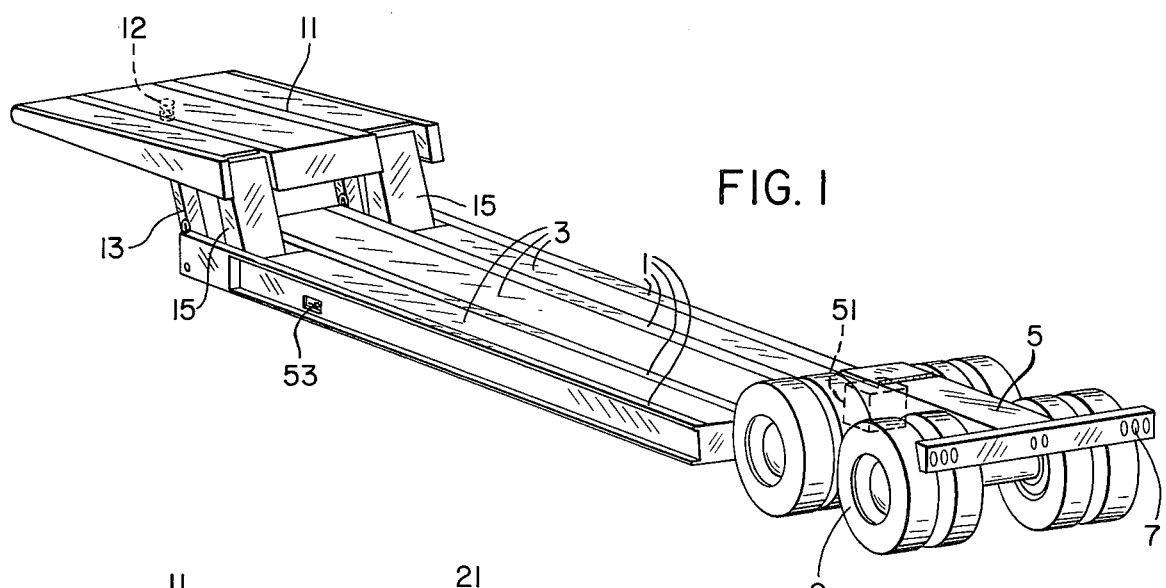
FIG. 1 is a perspective view showing the trailer with the gooseneck in the raised position.
Figure 2:
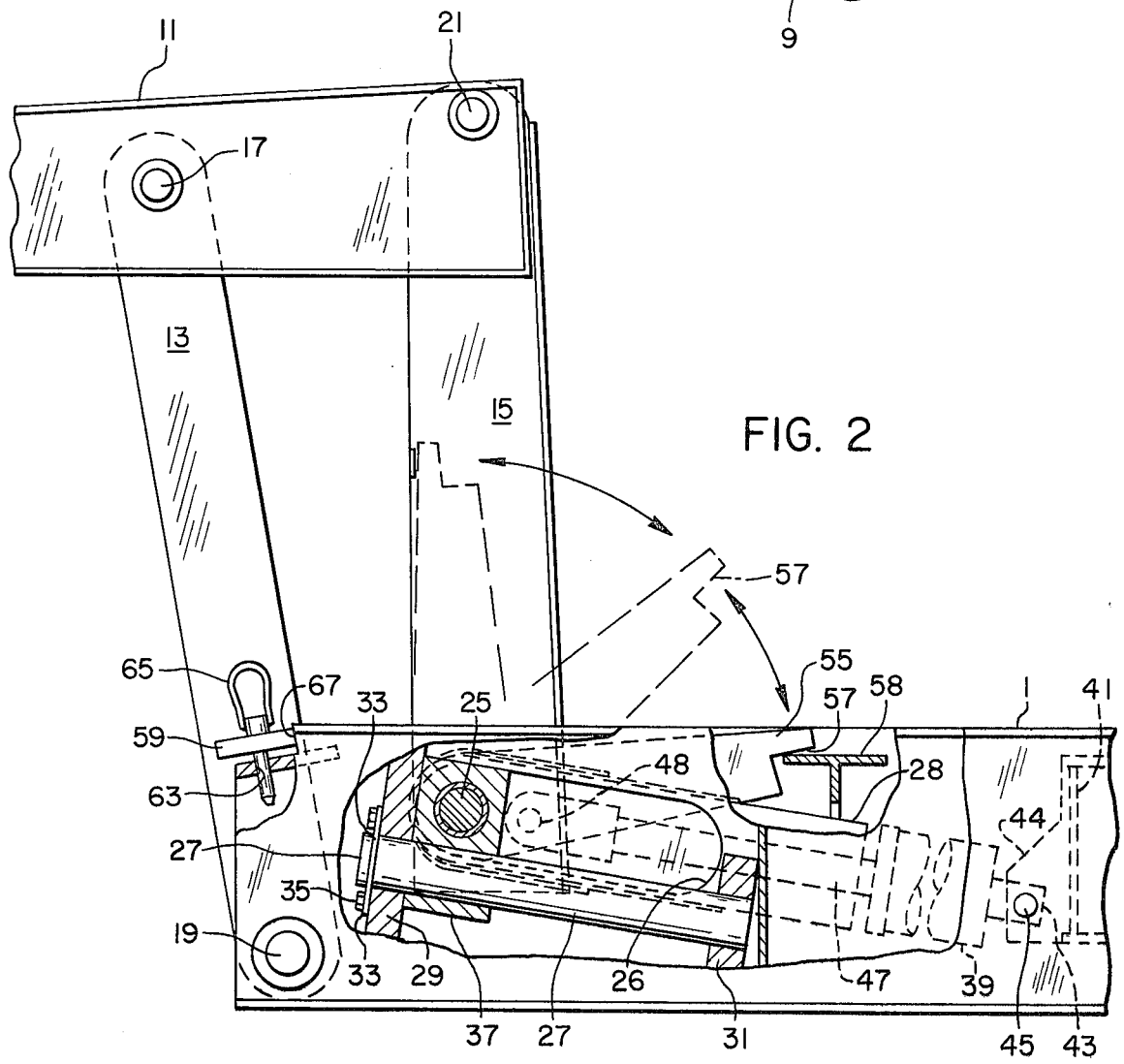
FIG. 2 is an elevational view of the front left side of the trailer partially broken away to show the internal construction and details of the mechanism by which the gooseneck is folded.
Figure 3:
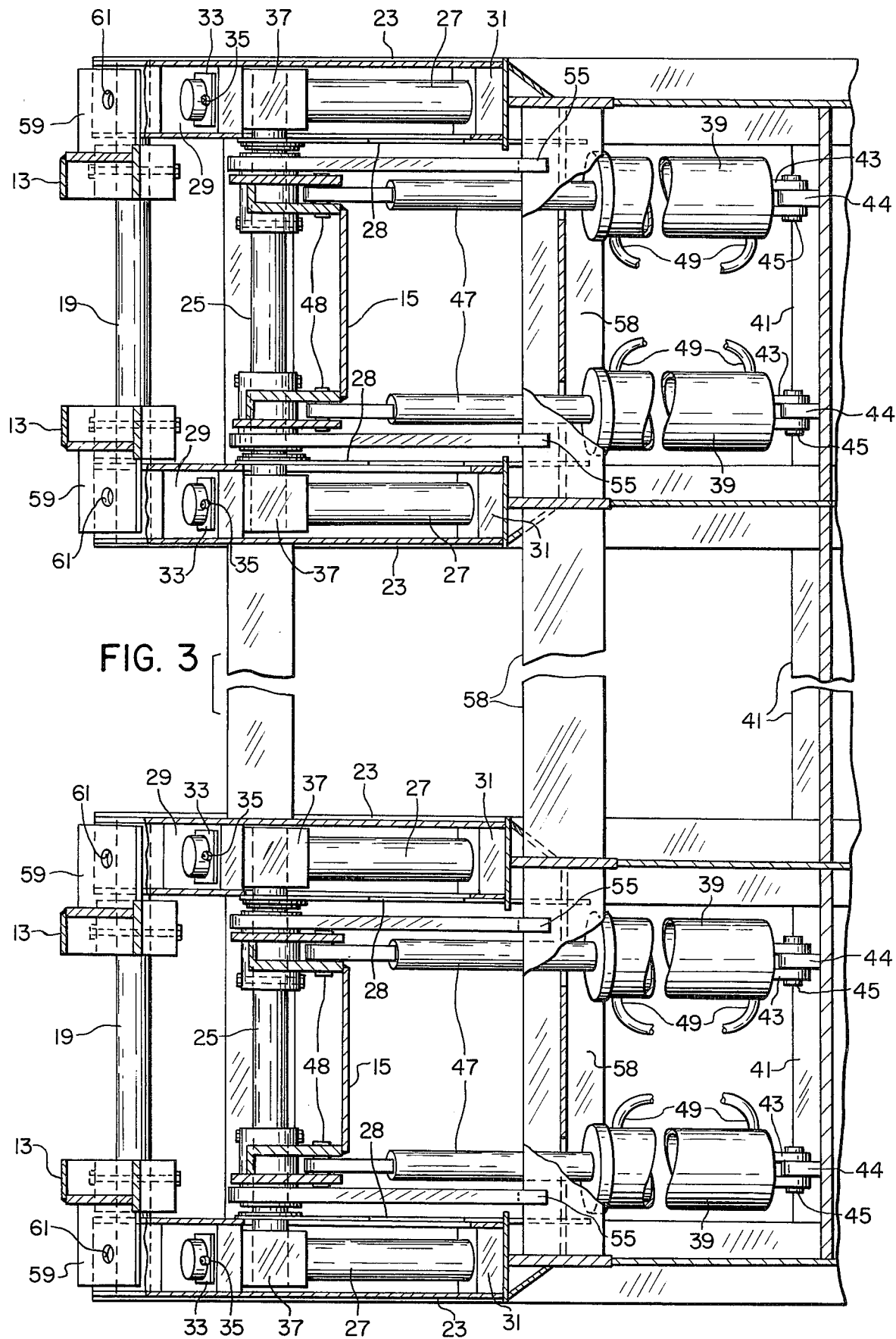
FIG. 3 is a plan view of the front of the trailer as seen from the top and partially broken away to show the internal construction of the folding mechanism of the trailer.
Figure 4:
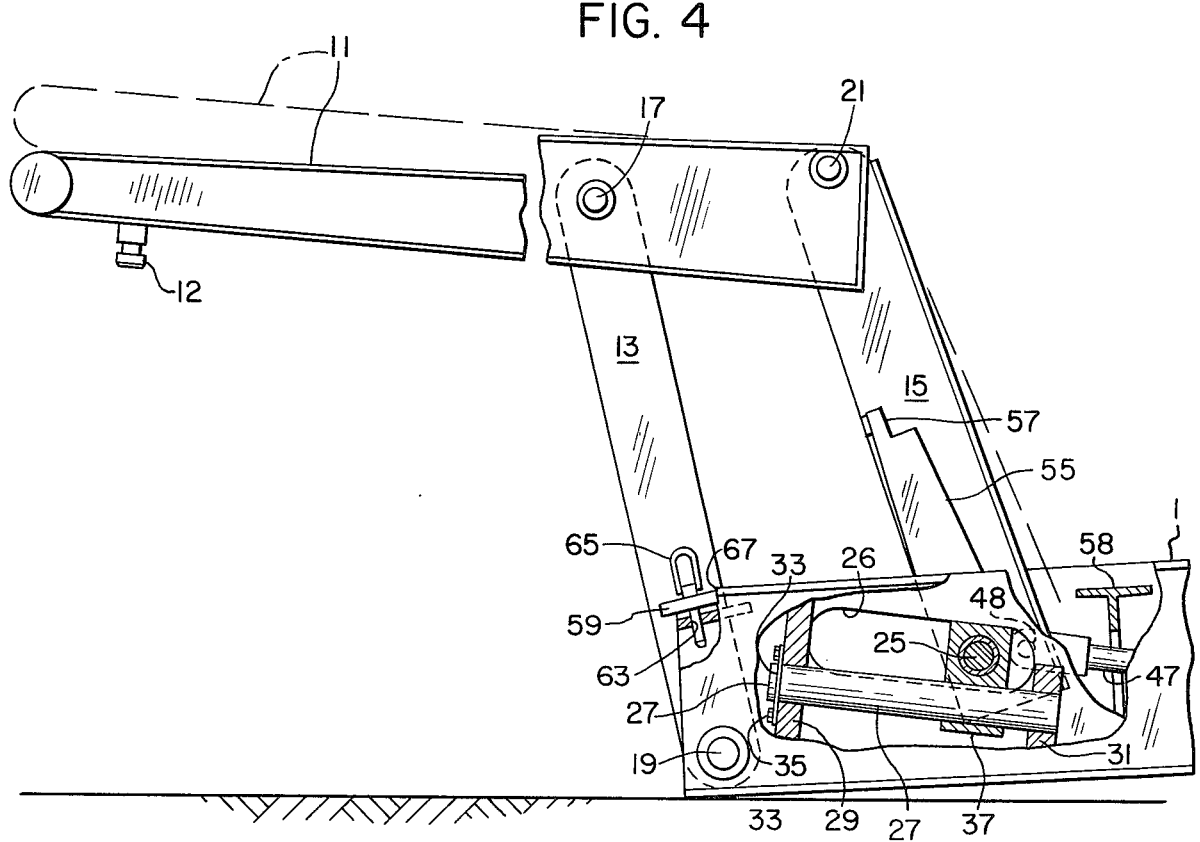
FIG. 4 is an elevational view of the front left side partially broken away to show details of the mechanism with the trailer platform on the ground and the gooseneck raised in a position to connect to the tractor.
Figure 5:
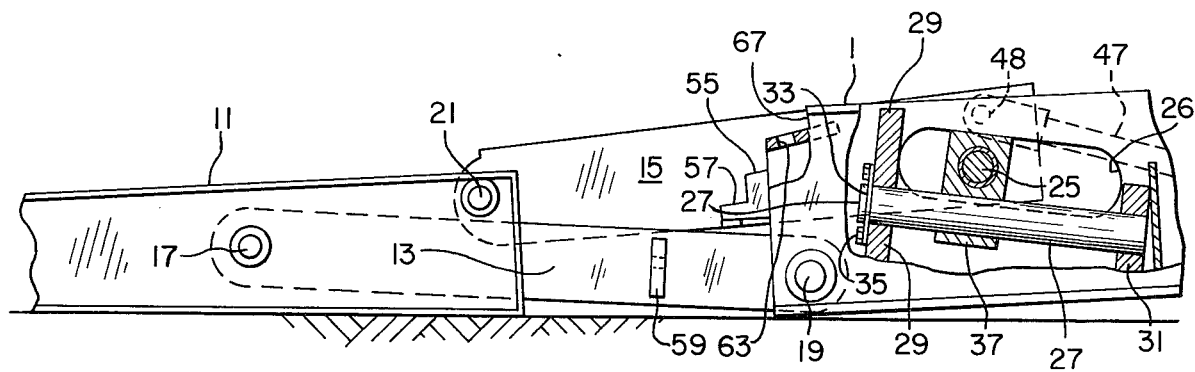
FIG. 5 is an elevational view of the front left side partially broken away to show details of the mechanism with the gooseneck folded to the ground to form a loading ramp.

The trailer, as illustrated in the drawings, consists of a load support platform hereinafter referred to as the "bed". At the front end of the bed is a folding gooseneck construction which will be more fully described below. The rear of the trailer is supported by a plurality of wheels and axles. The load support bed is made up of a plurality of longitudinal beams 1 which are covered with an appropriate decking material 3. The rear of the bed terminates in a narrow member 5 upon which may be mounted taillight 7 or other equipment such as mud flaps. The rear of the trailer is supported by a plurality of wheels and axles 9. At the forward end of the trailer is the folding gooseneck. The gooseneck comprises a sliding bar linkage including a horizontal hitch platform 11 having kingpin 12 thereon, a plurality of tension links 13, and a plurality of compression link(s) 15. When the gooseneck is folded down, the hitch platform 11 and the compression link(s) 15 form a part of the loading and unloading surface of the trailer. The tension links 13 are pivotally connected to platform 11 by shaft 17 and to the forward end of the bed by shaft 19. Compression link(s) 15 are pivotally attached to the hitch platform 11 by shaft 21. The lower end of compression link(s) 15 are connected to the bed of the trailer through a hydraulically activated sliding mechanism more fully described below.

The front of the trailer defines a plurality of rectangular box sections 23. The compression link(s) 15 are positioned between these box sections and are pivotally mounted on shafts 25, the ends of which intrude into box sections 23 through longitudinal slot 26 in the sides of the box section wall. Each slot 26 has a telescoping cover 28 more precisely described later. Within each box section 23 is a cylindrical bearing way 27. Way 27 lies on a longitudinal plane of the box section 23 and is inclined slightly upward at one end. Way 27 is rigidly positioned within box 23 by forward mounting block 29 and rear mounting block 31. Way 27 is restrained from movement along its longitudinal axis by retaining plate 33 which is joined to forward mounting block 29 by bolts 35. This construction forms an inclined plane. A slideable bearing 37 is mounted on each end of the shafts 25. Bearing 37 is also operatively attached to cylindrical way 27 in a manner which permits the bearing 37 to slide along way 27 as described below. The bearings are operatively connected to the lower ends of compression link(s) 15 by shaft 25.

Slot 26 in the side of box sections 23 is covered by a telescoping cover 28 attached to bearing 37 and arranged to slide through crossmember 58 so that slot 26 is covered at all positions of bearing 37 to prevent entry of water or other foreign objects thrown up by the tractor tires into box sections 23.

A plurality of fluid cylinders 39 are mounted within the forward end of the trailer bed between beams 1. Each hydraulic cylinder 39 is pivotally attached to a front crossmember 41 of the trailer by means of a yoke 43, an ear 44 on the crossmember 41 and a pivot pin 45. Each cylinder 39 has an extensible rod 47 the end of which is pivotally connected to one of the compression link(s) 15 by a pin 48. It should be pointed out, the off center location of the pin 48 in relation to shaft 25 in compression link(s) 15 is such that extension or retraction of cylinders 39 induces rotation to fold the gooseneck. In the illustrated embodiment two cylinders are attached to each compression link. It will be recognized by those skilled in the art that with appropriate changes one cylinder could readily be substituted for the two cylinders 39 which are connected to each compression link. Each cylinder 39 is supplied with pressure fluid through a line 49 from an on-board power supply 51 mounted at the rear of the trailer. The flow of fluid to and from cylinders 39 is controlled by a conventional valve 53 within line 49. On-board power supplies are well-known and it will be recognized by those skilled in the art that the fluid supply to cylinders 39 could come from any one of several sources and need not be mounted on the trailer. For instance, power supplies mounted on the tractor could serve as well. It will be further apparent to those skilled in the art that the cylinders may be powered by air or hydraulic or a combination thereof. The cylinder may also readily be replaced in part or in whole by mechanical means or the gooseneck could be operated manually.

Means for locking the gooseneck in the upright position is provided. This includes a plurality of stop blocks 55 pivotally mounted on shafts 25. Stop blocks 55 contain a notch 57 on their outer ends. Notch 57 is intended to mate against a crossmember 58 when the stop blocks are in the horizontal position. The blocks can be moved from the horizontal to a vertical position by pivotal motion about shaft 25. The locking means further includes an ear 59 on the tension link 13. The ear 59 defines a hole 61 which, when the gooseneck is in the upright position, aligns with hole 63 in the forward end of the trailer bed. The forward end of the trailer bed defines a shoulder 67 which mates with ear 59 when the gooseneck is in the upright position. When the gooseneck is in the upright position, locking pin 65 can be inserted through holes 61 and 63 which will prevent forward movement of the tension link 13.

OPERATION

To illustrate the operation of the trailer, assume that the gooseneck is in the upright position and locked in place and attached to the fifth wheel of the tractor. In this position, the bed will be parallel with the ground and stop blocks 55 will be in a horizontal position with notch 57 resting against crossmember 58.

The lower the bed to the ground, cylinders 39 are extended slightly to take the load off stop blocks 55. The stop blocks 55 are then pivoted about shafts 25 to a vertical position. Cylinders 39 are then retracted. This retraction causes the bearings 37 to slide down and rearward along ways 27. This alters the position of the lower end of compression link(s) 15 and lowers the forward end of the trailer bed to the ground. The kingpin 12 is then disconnected from the fifth wheel of the tractor and the tractor can be driven away. Further retraction of cylinders 39 will raise the gooseneck and take the load off pin 65 allowing pins 65 to be removed from holes 61 and 63. The cylinders 39 are now extended, causing the bearings 37 to slide upward along ways 27. The extension of cylinders 39 causes compression link(s) 15 and tension links 13 to pivot about shafts 25 & 21 and 19 & 17 respectively, until the hitch platform is resting on the ground. The sliding action of 37 on way 27 allows the hitch platform to adjust to irregularities of the ground. In this position, the hitch platform and compression link(s) 15 form a ramp over which equipment or cargo can be loaded onto the trailer bed.

After the trailer has been loaded or unloaded, the gooseneck and the trailer bed can be raised by reversing the above described process. The cylinders 39 are fully retracted causing the bearing blocks 37 to slide rearward and downward along ways 27. Compression link(s) 15 and tension links 13 pivot about shafts 21 & 25 and 19 & 17 respectively, raising the hitch platform. Holes 61 and 63 are aligned and the locking pins 65 are inserted therein. But stop blocks 55 are left in the vertical position. Cylinders 39 are extended until the tip of the hitch platform is inclined slightly upward to provide proper clearance for the tractor and fifth wheel. The tractor is then driven under the hitch platform so that the king pin engages the fifth wheel of the tractor and is locked in place. Cylinders 39 are again extended causing the bearing 37 to slide forward and upward along ways 27. This action raises the trailer bed upward off the ground in a position suitable for travel. Stop blocks 55 are lowered until the notches 57 engage the front crossmember 59. The trailer is now ready for hauling.

The ability to move the relative position of the lower end of the compression link(s) 15 in relation to the trailer bed through sliding motion along the longitudinal axis of ways 27 can be used to provide a variety of other results. Some examples follow. If some support members 71 such as wood or metal blocks are placed under the bed adjacent the rear wheels and axles 9 of the trailer the above described lowering action will cause the bed to pivot in a vertical plane over the blocks and raise the rear wheels off the ground. In this manner, the trailer mechanism with its sliding members can be used as a jack for changing tires or making other repairs.

With the gooseneck and the trailer coupled and tension links 13 locked to the bed with pins 65, and stop blocks 55 in vertical position, cylinders 39 may be retracted. This moves bearings 37 back and down along ways 27 and causes the bed to lower allowing the trailer to more readily pass under overhead objects.

With the tractor and trailer still coupled and the bed resting on the ground, there is available sufficient clearance to move the lower end of compression link(s) 15 far enough back that the resulting upward movement of the end of the hitch platform will raise the rear wheels of the tractor from the ground. Thus, in a manner similar to that described for the trailer wheels and axles, the trailer mechanism with its sliding members may be used as a jack to facilitate the changing of the tractor tires or to aid in making other repairs to the tractor or other equipment.

The relative position of the tension and compression links can also be adjusted to provide increased ground clearance. With the tractor and trailer coupled, pins 65 are removed releasing the tension links 13 for forward movement. The cylinders 39 are retracted so that the bed lowers to the ground. Further retraction of the cylinders 39 causes the tension links 13 to pivot about shaft 19 and ear 59 moves away from the shoulder 67 on the front end of the bed. A plurality of spacer blocks 69 are then inserted between ears 59 and the shoulder 67. The cylinders are then extended and the tension links pivot backward shaft 19 causing ear 59 to compress the spacer blocks 69 against shoulder 67. The spacer blocks change the angle of the tension links 13 relative to the bed, and as cylinders 39 are further extended, the bed is raised to a point of elevation greater than normal, providing extended ground clearance which allows the trailer to pass over uneven terrain more readily.

As described, the preferred embodiment of the invention includes a sliding bar linkage. Its operation is described in detail. It will be apparent to those skilled in the art that many modifications to the sliding bar linkage, such as the location at top or bottom of either link(s) or in the link(s) themselves and the angle of the slide for direction of movement, can be made without departing from the true spirit and scope of the invention. We claim as our invention all such modifications as fall within the scope of the appended claims.

We claim:
1. An industrial trailer comprising:
   a bed;
   a ground engaging wheel attached to the bed;
   an articulated gooseneck including a hitch platform, a first link, one end of the first link slidably and pivotably attached to the bed and the other end pivotably attached to the platform;
   and a second link pivotably attached at one end to the platform and pivotably attached at the other end to the bed.

2. An industrial trailer comprising:
   a bed;
   a ground engaging wheel attached to the bed;
   a selectively erectable or collapsable gooseneck including a hitch platform and a first and a second link having an upper and a lower end, the upper end of each link pivotably connected to the hitch platform;
   the lower end of the first link operatively connected to the bed and slidable along the bed of the trailer when the gooseneck is erected or collapsed;
   and the lower end of the second link nonslidable and pivotably attached to the bed.

3. An industrial trailer comprising:
   a bed;
   a wheel and axle attached to the rear of the bed;
   a selectively erectable or collapsible gooseneck including a hitch platform;
   a first link pivotally connected to the platform and pivotally connected to the bed;
   a second link pivotally connected to the platform and slideably connected to the bed; and
   means connected to the gooseneck for pivoting the gooseneck from a vertical position to a horizontal position.

4. Apparatus according to claim 3 wherein the gooseneck pivots and slides from a vertical to a horizontal position while the bed is simultaneously lowered to the ground.

5. The combination with a tractor, an industrial trailer comprising:
   a bed;
   a way on the bed;
   a wheel and axle attached to the bed;
   a gooseneck including a hitch platform;
   a first link pivotally connected to the platform and to the bed;
   a second link having an upper an a lower end, the upper end pivotally connected to the platform and the lower end slidably connected to the way on the bed of the trailer; and
   means connected to the gooseneck for pivoting the gooseneck from a vertical to a horizontal position so that the bed is lowered to the ground when the trailer is detached from the tractor.

6. Apparatus according to claim 5 wherein the way is disposed within the bed of the trailer.

7. Apparatus according to claim 6 wherein the way is disposed within the bed to form an inclined plane.

8. Apparatus according to claim 5 wherein the way is of cylindrical cross-section and inclined upward from the rear of the trailer toward the front of the trailer.

9. Apparatus according to claim 8 wherein the way is enclosed within a box section on the trailer bed, the box section having an elongate slot in one side, the slot being covered by a slideable member operatively attached to the gooseneck.

10. Apparatus according to claim 9 wherein the slideable cover member is telescoping.

11. An industrial trailer comprising:
    a bed;
    a way on the bed;
    a wheel and axle attached to the bed;
    a gooseneck including a hitch platform having a pin thereon;
    a first link pivotally connected to the platform and pivotally connected to the bed;
    a shaft operatively connected to the bed;
    a second link having an upper end and a lower end, the upper end pivotally connected to the platform and pivotally connected at the lower end to the shaft, the shaft slidably connected to the way on the trailer bed; and
    means for altering the position of the lower end of the second link relative to the way.

12. Apparatus according to claim 11 wherein the positioning means comprises a cylinder, a control, and means for supplying power to the cylinder.

13. Apparatus according to claim 12 wherein the power means is contained on the trailer.

14. Apparatus according to claim 11 wherein the positioning means is pneumatic.

15. Apparatus according to claim 11 wherein the positioning means is hydraulic.

16. The combination with a tractor, a trailer including a bed having a front and a rear end;
    an axle having a ground engaging wheel attached to the rear of the bed;
    a foldable gooseneck including a hitch platform having a front and a rear end, the platform having a kingpin thereon;
    a first link pivotally attached adjacent the rear of the hitch platform and pivotally attached to the front end of the bed;
    a second link having an upper and lower end, the upper end pivotally attached to the rear of the hitch platform and the lower end pivotally and slidably connected to the bed; and
    means operatively connected to the gooseneck to pivot the first link and simultaneously pivot and slide the second link so that the front of the bed is lowered to the ground while attached to the trailer; and the gooseneck folds to a horizontal position after the tractor is disconnected from the trailer.

17. Apparatus according to claim 16 wherein the gooseneck includes means for locking the gooseneck to the bed.

18. Apparatus according to claim 17 wherein the locking means includes, in combination, an ear attached to the first link, the ear defining a first hole;

and the front of trailer bed having a shoulder defining a second hole, the ear mating to the shoulder when the gooseneck is in an upright position;

and a pin manually insertable simultaneously through the first and second holes;

whereby the gooseneck is locked in an upright position.

19. Apparatus according to claim 17 wherein the locking means includes a stop block pivotable from a vertical to a horizontal position to restrain rearward movement of the second link.

20. The method of raising the bed of a tractor attached industrial trailer relative to the ground the trailer having an adjustable non-removable gooseneck having a first pivotable link and a second slidable link interposed between a hitch platform and the bed, the method comprising:

lowering the bed to the ground;

pivoting the first and second link about the hitch platform and about the bed;

inserting a block between the first link and the bed, sliding the second link relative to the bed and pivoting the first link relative to the bed and the hitch platform so that the block is compressed between the first link and the bed; and further sliding the second link relative to the bed so that the bed is raised from the ground.

21. The method of angularly adjusting the hitch platform of a tractor attached industrial trailer having an adjustable gooseneck including a pivotable first link and a slideable second link interposed between the hitch platform and the trailer bed, the method comprising:

lowering the bed to the ground;

sliding one end of the second link relative to the bed so that the hitch platform pivots about the first link, thereby raising the tractor attached end of the hitch platform so that the tractor wheels are raised about the ground.

22. The method of raising the rear of the bed of a tractor attached industrial trailer having ground engaging wheels at the rear of the bed and an adjustable gooseneck which includes a first link having a pivotable upper end and a slidable lower end, and a second link having a pivotable upper and lower end, the links interposed between a hitch platform and the tractor bed at the front of the bed the method comprising:

placing support means under the bed of the trailer near the ground engaging wheels and forwardly therefrom;

pivoting the upper end of the first link attached to the hitch platform;

sliding the lower end of the first link relative to the bed of the trailer;

and pivoting the upper and lower ends of the second link relative to the bed and the hitch platform so that the front of the bed is lowered and the bed pivots in a vertical plane about the support means thereby raising the wheels off the ground.

23. The method of lowering the bed of a tractor attached industrial trailer with an adjustable nonremovable gooseneck thereon relative to the ground, the gooseneck including a hitch platform and having first and second pivotable pinks interposed between the hitch platform and the bed, each of the links having an upper end and a lower end, one end of the first link also being slidable along the bed, the method comprising:

simultaneously pivoting and rearwardly sliding the lower end of the first link relative to the bed;

pivoting the upper end of the first and second links relative to the hitch platform and the bed;

pivoting the lower end of the second link relative to the bed.

* * * * *